VOLTAGE-REGULATOR CIRCUIT

Original Filed Aug. 24, 1955 2 Sheets-Sheet 1

VOLTAGE-REGULATOR CIRCUIT

Original Filed Aug. 24, 1955 2 Sheets-Sheet 2

United States Patent Office

Re. 25,226
Reissued Aug. 14, 1962

25,226
VOLTAGE-REGULATOR CIRCUIT

William J. Heacock, Jr., Levittown, N.Y., assignor to Hazeltine Research, Inc., Chicago, Ill., a corporation of Illinois Original No. 2,826,735, dated Mar. 11, 1958, Ser. No. 530,384, Aug. 24, 1955. Application for reissue Jan. 28, 1960, Ser. No. 5,327
8 Claims. (Cl. 323—22)

Matter enclosed in heavy brackets [ ] appears in the original patent but forms no part of this reissue specification; matter printed in italics indicates the additions made by reissue.

GENERAL

This invention relates to voltage-regulator circuits for supplying a constant magnitude direct-current voltage to a load and, particularly, to such voltage-regulator circuits which have both a high degree of direct-current stability and a high degree of alternating-current stability.

It has been heretofore proposed to provide a voltage-regulator circuit which utilizes an electron-discharge tube to adjust the magnitude of a direct-current voltage supplied to a load and an amplifier circuit which is responsive to variations in the voltage supplied to the load for controlling the conductivity of the electron tube to compensate for any voltage variations. In order to provide a high degree of direct-current stability it is necessary that the amplifier portion of the voltage-regulator circuit have a rather large amount of gain. When a large amount of gain is provided, however, the tendency of the closed loop feed-back circuit formed by the electron tube and the amplifier to oscillate is greatly increased. This tendency to oscillate is indicative of poor alternating-current stability and is particularly trublesome where, from time to time, the current drawn by the load undergoes sharp transient variations. This is because such transient variations contain high-frequency components which may serve to initiate either a transient or a sustained self-oscillation of the feed-back circuit of the voltage regulator.

It is an object of the invention, therefore, to provide a new and improved voltage-regulator circuit having both a high degree of direct-current stability and a high degree of alternating-current stability and which is not readily susceptible to self-oscillation.

In accordance with the invention, a voltage-regulator circuit for supplying a constant magnitude direct-current voltage to a load and normally having circuit capacitance coupled across the output terminals thereof which tends to cause the voltage-regulator circuit to oscillate comprises supply circuit means for supplying a direct-current voltage and an [electron-discharge device] *electronic valve* for adjusting the magnitude of the direct-current voltage supplied to the load. The voltage-regulator circuit also includes amplifier circuit means responsive to variations in the magnitude of the voltage supplied to the load for controlling the operation of the [electron-discharge device] *electronic valve* to compensate for such voltage variations. The voltage-regulator circuit further includes first impedance means for isolating the closed loop feed-back circuit formed by the [electron-discharge device] *electronic valve* and the amplifier circuit means from the circuit capacitance for minimizing undesired high-frequency phase shift introduced thereby which tends to cause this closed loop feed-back circuit to undergo high-frequency oscillation. Additionally, the voltage-regulator circuit includes second impedance means for by-passing the first impedance means for enabling normal operation of the voltage-regulator circuit for the lower frequency components of the load current variations.

For a better understanding of the present invention, together with other and further objects thereof, reference is had to the following description taken in connection with the accompanying drawings, and its scope will be pointed out in the appended claims.

Referring to the drawings.

DESCRIPTION AND OPERATION OF CONVENTIONAL VOLTAGE-REGULATOR CIRCUIT OF FIG. 1

Figure 1A:
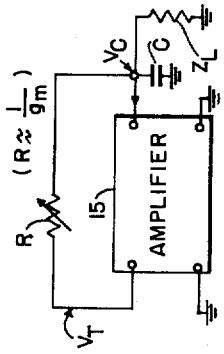
FIG. 1a is an alternating-current equivalent circuit diagram for the voltage-regulator circuit of FIG. 1.
Figure 1:
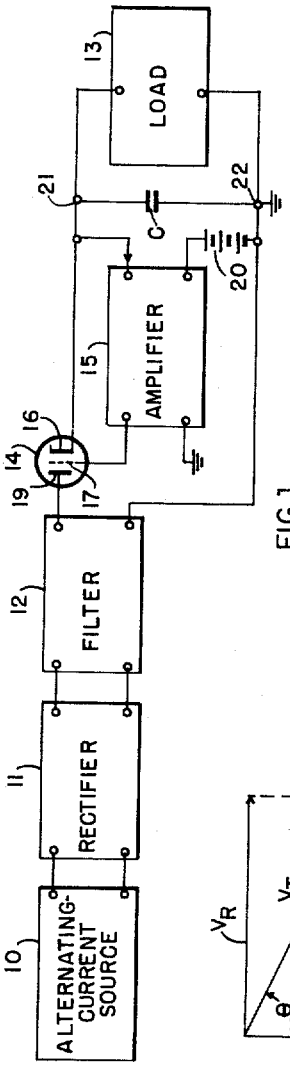
FIG. 1 is a circuit diagram, partly schematic, of a conventional voltage-regulator circuit of the series type.

Referring to FIG. 1 of the drawings, there is shown a conventional form of voltage-regulator circuit of the series type. The voltage regulator there shown includes an alternating-current source 10 coupled in cascade with a rectifier 11 and a smoothing filter 12, these three units acting in conjunction with one another to supply an unregulated direct-current voltage at the output terminals of the filter 12. This unregulated direct-current voltage is, in turn supplied to a load 13 by way of the intermediate circuits which serve to regulate this direct-current voltage so that the magnitude of the voltage supplied to the load 13 is maintained constant in spite of any variations in the current drawn by the load 13 or in spite of any fluctuations in the magnitude of the alternating current supplied by the source 10.

The voltage-regulator circuit includes a series-regulator tube 14, which may be of the conventional triode type, and an amplifier circuit 15 which is coupled between the output electrode of the tube 14, in this case the cathode 16, and the control electrode 17 of the tube 14. The voltage-regulator circuit also includes a high-frequency by-pass condenser C and a source of voltage reference potential as represented by the battery 20. The amplifier 15 serves to compare the voltage level at an output terminal 21 of the voltage-regulator circuit with the voltage supplied by the voltage reference source 20 so as to supply a signal representative of the difference between these two voltages to the control electrode 17 of the tube 14. In this manner, if the magnitude of the voltage at the output terminal 21 deviates from its desired constant value, then the signal supplied by the amplifier 15 to the control electrode 17 is of such magnitude and polarity as to change the conductivity of the tube 14 so as to oppose the change in the magnitude of the voltage at the output terminal 21.

Where a high degree of direct-current stability is required of the voltage-regulator circuit, it is necessary that the amplifier 15 have a large gain factor. This enables the amplifier 15 to be very sensitive to any change in the magnitude of the output voltage at the terminal 21' and hence enables the voltage-regulator circuit to hold this output voltage very close to the desired operating value. To this end, the amplifier 15 may includes several stages of amplification. As mentioned, however, where the gain of the amplifier 15 is very high, the tendency of the closed loop feed-back circuit formed by the tube 14 and the amplifier 15 to oscillate is greatly increased.

The factor which cause the voltage-regulator circuit to oscillate may be more readily understood by referring to FIG. 1a which is the alternating-current equivalent circuit [diaphragm] *diagram* for the voltage-regulator circuit of FIG. 1. In FIG. 1a, the variable conductance of the series-regulator tube 14 has been represented by a variable resistor R which is approximately equal to $$\frac{1}{g_m}$$

where $g_m$ is the transconductance factor of the tube 14. Also, the load 13 has been represented diagrammatically by an equivalent impedance $Z_L$. It will thus be noticed from the FIG. 1a diagram that the signal at the output of the amplifier 15 is fed back by way of a feed-back path including the equivalent resistor R to the input terminals of the amplifier 15. For the higher frequency range, which is the range of particular interest, the reactance of the by-pass condenser C is small compared to the resistance of the load $Z_L$ and hence for present purposes, the presence of the load $Z_L$ may be ignored. In this manner, the current flowing through the feedback path passes through both the resistor R and the condenser C, which means that there is a substantial shift in phase between the voltage signal at the output terminals of the amplifier 15 and the voltage signal fed back to the input terminals of the amplifier 15.

Figure 1B:
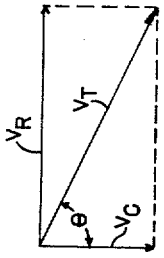
FIG. 1b is a vector diagram used in explaining the operation of the voltage-regulator circuit of FIG. 1.

This phase shift may be more readily understood by reference to the vector diagram of FIG. 1b. Thus, assuming a feed-back current to be flowing through the feed-back path including the resistor R and the econdenser C, then a voltage drop $V_R$ is developed across the equivalent resistor R while a voltage drop $V_C$ is developed across the condenser C. The resultant of these two voltage drops is denoted by the vector $V_T$ and represents the voltage signal at the output terminals of the amplifier 15. As is apparent, the voltage signal at the amplifier 15 input is denoted by the vector $V_C$ which lags the amplifier 15 output voltage $V_T$ by a phase angle $\theta$.

For direct-current and low-frequency signal variations, the amplifier 15, in addition to amplifying any signal variation translated thereby, is also effective to invert the polarity of such signal variations. In other words, the signal supplied at the output terminals of the amplifier 15 after translation thereby is 180° out of phase with such signal as originally supplied to the input terminals of amplifier 15. Assuming no phase shift in the feed-back path including the equivalent resistor R, this, then, is the required condition for negative or degenerative feed-back operation. Such operation does, in fact, occur over the lower frequency range because the reactance of condenser C is large and, hence, the voltage signal $V_C$ which is fed back to the amplifier 15 input is very nearly in phase with the output voltage signal $V_T$. At higher frequencies, however, more of the feed-back signal is developed across the resistor R while less is developed across the condenser C. This is because the reactance of the condenser C decreases as the frequency increases. Thus, at some high frequency the feed-back signal component $V_C$ at the input to the amplifier 15 is going to be very nearly 90° out of phase with the feed-back component $V_T$ at the output of the amplifier 15. This 90° phase shift together with the phase shifts which normally occur within the amplifier 15 at these frequencies will be sufficiently great so as to cause positive or regenerative feed-back operation to occur. When this occurs, the closed loop feed-back circuit will oscillate. This self-oscillation is of course highly undesirable in a voltage-regulator circuit which is intended to supply a constant magnitude direct-current signal to the load 13.

From the foregoing, it is apparent that the phase shift caused by the by-pass condenser C, which is connected directly across the output terminals 21, 22 of the voltage-regulator circuit, is effective at higher frequencies to cause self-oscillation of the voltage-regulator circuit. This by-pass condenser C, however, must be present in order that the voltage-regulator circuit may have a very low output impedance over the higher frequency range. Otherwise, the output impedance of the regulator circuit, which is common to all the multistage circuits which make up the load 13, would cause undesirable interstage coupling between such load circuits.

DESCRIPTION OF VOLTAGE-REGULATOR CIRCUIT OF FIG. 2

Figure 2:
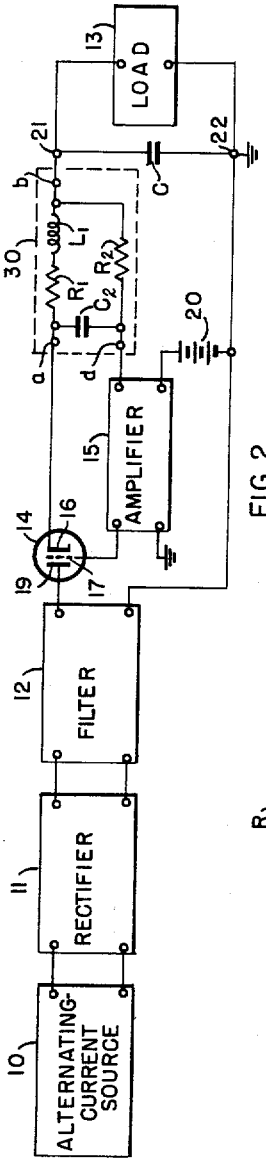
FIG. 2 is a circuit diagram, partly schematic, of a series-type voltage-regulator circuit constructed in accordance with the present invention.

Referring now to FIG. 2 of the drawings, there is shown a series-type voltage-regulator circuit, constructed in accordance with the present invention, for supplying a constant magnitude direct-current voltage to the load 13 and normally having circuit capacitance as represented, for example, by the condenser C coupled across the output terminals 21, 22 thereof which tends to cause the voltage-regulator circuit to oscillate. Parts of the voltage-regulator circuit of FIG. 2 are similar to corresponding parts of the voltage-regulator circuit of FIG. 1 and accordingly the same reference numerals have been used for corresponding elements in the two figures.

Considering the voltage-regulator circuit of FIG. 2, such circuit includes supply circuit means for supplying a direct-current voltage. This supply circuit means may include, for example, the alternating-current source 10 coupled in cascade with the rectifier 11 and the filter 12. the voltage-regulator circuit of FIG. 2 also includes an *electronic valve such as* electron-discharge device 14 having a cathode 16, a control electrode 17, and an anode 19 for adjusting the magnitude of the direct-current voltage supplied to the load 13. For the series-type regulator shown in FIG. 2, the electron-discharge device or tube 14 is connected such that the anode 19 to cathode 16 discharge path thereof is coupled in series between the supply circuit means and a first one of the output terminals 21, 22 of the voltage-regulator circuit.

Additionally, the voltage-regulator circuit constructed in accordance with the present invention includes amplifier circuit means 15 responsive to variations in the magnitude of the voltage supplied to the load 13 for controlling the operation of the electron-discharge device 14 to compensate for such voltage variations. For the case of the series-type voltage regulator shown in FIG. 2, the amplifier circuit means is coupled between the control electrode 17 of the tube 14 and the first-mentioned output terminal 21 of the voltage-regulator circuit, the coupling to the output terminal 21 being by way of a compensating network 30 which will be discussed presently.

The voltage-regulator circuit of FIG. 2 further includes first impedance means for isolating the closed loop feed-back circuit formed by the electron-discharge device 14 and the amplifier circuit means 15 from the circuit capacitance represented by the condenser C for minimizing undesired high-frequency phase shift introduced thereby which tends to cause this closed loop feed-back circuit to undergo high-frequency oscillations. This first impedance means may include, for example, a resistor $R_1$ connected in series with an inductance coil $L_1$ for isolating the closed loop feed-back circuit from the circuit capacitance C. As is apparent from the drawing, resistor $R_1$ and inductance coil $L_1$ constitute a part of the compensating network 30. For producing the desired isolation, this first impedance means is connected in series between the output terminal 21 of the voltage-regulator circuit and a point "a" common to one of the other electrodes, for example the cathode 16 of the electron-discharge device 14, and the input to the amplifier circuit means 15.

Lastly, the voltage-regulator circuit of FIG. 2 includes second impedance means for by-passing the first impedance means represented by the resistor $R_1$ and the inductance coil $L_1$ for enabling normal operation of the voltage-regulator circuit for the lower frequency components of the load current variations. This second impedance means may include, for example, a by-pass resistor $R_2$ and a condenser $C_2$ for enabling the resistor $R_2$ to by-pass the first impedance means for the lower frequency components of the load current variations.

OPERATION OF VOLTAGE-REGULATOR CIRCUIT OF FIG. 2

Considering the operation of the series-type voltage-regulator circuit of FIG. 2 just described, this voltage-regulator circuit, except for the presence and effect of the compensating network 30, operates in the same manner as the conventional voltage-regulator circuit of FIG. 1 for supplying a constant magnitude direct-current voltage to the load 13. As mentioned in connection with the conventional voltage-regulator circuit of FIG. 1, such circuit tends to oscillate due to the undesirable high-frequency phase shift produced by the circuit capacitance represented by the condenser C. Such high-frequency oscillations may be started or triggered, for example, by the high-frequency components of electrical noise which is always present to some degree in all physical circuits. In the voltage-regulator circuit of FIG. 2, which is constructed in accordance with the present invention, such tendency of the regulator circuit to oscillate is either eliminated or considerably reduced by the action of the impedance elements of the compensating network 30.

Figure 2B:
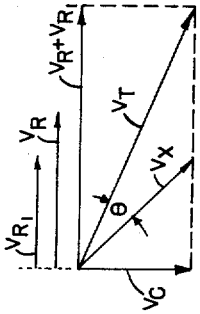
FIG. 2b is a vector diagram used in explaining the operation of the voltage-regulator circuit of FIG. 2.

A key element of the compensating network 30 is the resistor $R_1$ which serves to isolate the closed loop feed-back circuit formed by the amplifier 15 and the tube 14 from the circuit capacitance represented by the by-pass condenser C for minimizing the undesired high-frequency phase shift introduced around the feedback circuit by such circuit capacitance. The operation of this isolating resistor $R_1$ may be better understood by referring to FIGS. 2a and 2b, FIG. 2a being an alternating-current equivalent circuit diagram for the voltage-regulator circuit of FIG. 2 while FIG. 2b is a vector diagram which illustrates the phase relationships of the various voltages developed around the feed-back loop. As before, the equivalent resistor R represents the variable conductivity of the utbe 14 while the resistor $Z_L$ represents the equivalent impedance of the load 13. More precisely, FIG. 2a represents the equivalent circuit diagram for the high-frequency signal variations only, as will subsequently become apparent.

Figure 2A:
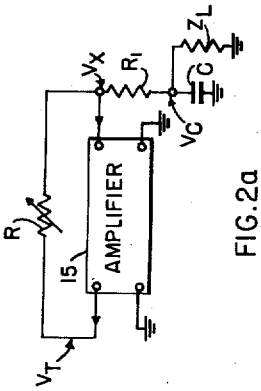
FIG. 2a is an alternating-current equivalent circuit diagram of the voltage-regulator circuit of FIG. 2 for the higher operating frequencies.

Considering a current flowing around the feed-back path including the resistor R, the resistor $R_1$, and the condenser C of the FIG. 2a circuit, it will be apparent that the voltage drop $V_{R1}$ across the resistor $R_1$ combines with the 90° out-of-phase voltage drop $V_C$ across the condenser C to form a voltage signal $V_x$ which is fed back to the input of the amplifier 15. The voltage signal at the output terminals of the amplifier 15, on the other hand, is the vector resultant of the input voltage $V_x$ and the voltage drop $V_R$ across the resistor R. This resultant is denoted by the symbol $V_T$. As will be apparent from the vector diagram of FIG. 2b, the voltage $V_x$ supplied back to the input of the amplifier 15 is out of phase by an angle $\theta$ with the output voltage $V_T$. It will also be apparent, however, by comparing FIG. 2b with FIG. 1b, that the phase shift around the feed-back path is not as great in the FIG. 2b case. This is because the resistor $R_1$ serves to isolate the effect of the circuit capacitance C from the feed-back circuit formed by the equivalent resistor R and the amplifier 15. As a result, the phase shift $\theta$ around the feed-back path is minimized to such an extent that the voltage-regulator circuit will not oscillate.

The inductance of coil $L_1$ is effective at frequencies higher than the former self-oscillation frequency of the regulator circuit for producing a leading phase shift which may be utilized to partially compensate for the lagging phase shift normally produced by the internal amplifier stages of the amplifier 15. For simplicity, this coil $L_1$ has not been shown on the equivalent circuit diagram of FIG. 2a.

Because the resistor $R_1$ isolates the amplifier 15 from the output terminal 21, the output impedance of the regulator circuits at low frequencies is increased by approximately the value of $R_1$. The resistance of the resistor $R_1$, even though it may be small, can thus be too great for the direct-current and lower frequency components drawn by the load 13. This is especially true where the load 13 draws rather heavy currents, in which case the voltage drop across even a small value of resistance is rather large. Accordingly, the comensating network 30 includes second impedance means for by-passing the isolating resistor $R_1$ for the lower frequency and direct-current components of the current variations drawn by the load. This second impedance means includes the resistor $R_2$ which serves to make a direct connection to the output terminal 21 of the voltage-regulator circuit and the coupling condenser $C_2$ which serves to shift the effective connection of the amplifier 15 input from the output terminal 21 to the cathode 16 of the tube 14 as the frequency is increased. In other words, for direct-current and low-frequency components, the reactance of the condenser $C_2$ is high compared to the resistance of the resistor $R_2$. As a result, therefore, the input of the amplifier 15 is effectively connected to and is responsive to the voltage variations at the output terminal 21. For these low-frequency components, then, the voltage-regulator circuit acts like the conventional voltage-regulator circuit of FIG. 1. As the frequency is increased, however, the reactance of condenser $C_2$ decreases until, for the high-frequency components, the reactance thereof is negligible compared to the resistance of the resistor $R_2$. In this condition, the input of the amplifier 15 is effectively connected to the cathode 16 of the tube 14 and, hence, the resistor $R_1$ is effective to isolate the feed-back circuit formed by the amplifier 15 and the tube 14 from the by-pass condenser C. As a result of this shifting action, self-oscillation of the voltage-regulator circuit is prevented for the higher frequency components while the conventional and more sensitive operation of the voltage-regulator circuit is effected for the lower frequency components. The presence of the isolating resistor $R_1$ at the higher frequencies is not objectionable as far as its effect on the output impedance of the regulator circuit is concerned because at these higher frequencies the reactance of the by-pass condenser C is small enough to maintain a very low output impedance.

While applicant does not intend to limit the invention to any particular design constants, the following values are representative for the elements of the compensating network 30 of the voltage-regulator circuit of FIG. 2, it being understood that the exact values of these components are dependent on the design of the amplifier 15 and the value of the by-pass condenser C:

| | | |
|---|---|---|
| Condenser $C_2$ | micromicrofarads | 470 |
| Inductance coil $L_1$ | microhenrys | 0.3 |
| Resistor $R_1$ | ohms | 0.5 |
| Resistor $R_2$ | do | 18,000 |

DESCRIPTION AND OPERATION OF FIG. 3 VOLTAGE-REGULATOR CIRCUIT

Figure 3:
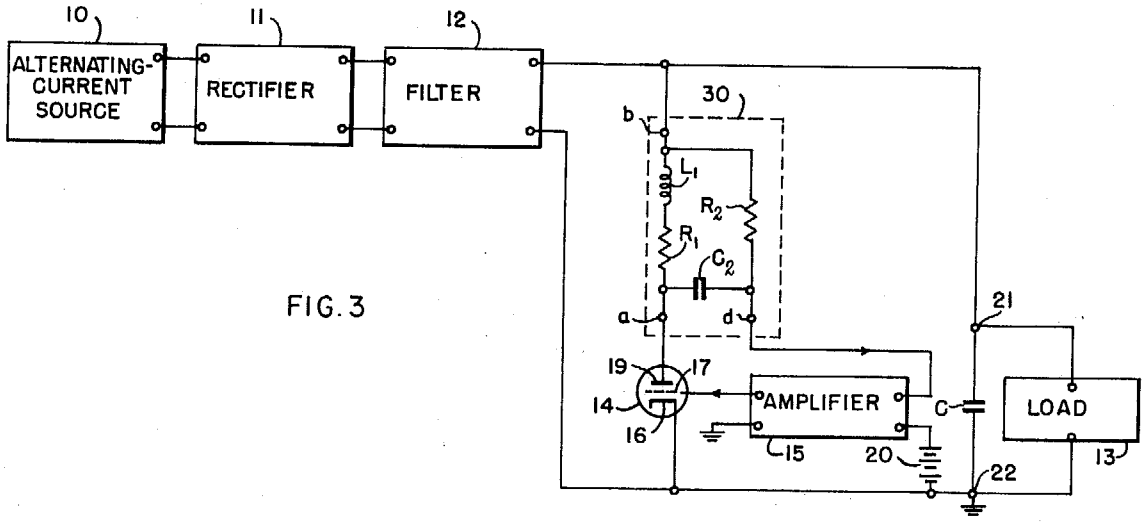
FIG. 3 is a circuit diagram, partly schematic, of a shunt-type voltage-regulator circuit constructed in accordance with the present invention.

Referring now to FIG. 3 of the drawings, there is shown a shunt-type voltage-regulator circuit designed in accordance with the present invention. This voltage-regulator circuit of FIG. 3 is similar to the series-type regulator of FIG. 2 except that the regulator tube 14 is connected in shunt across the output terminals of the filter 12, which terminals are also connected directly to the output terminals 21, 22 of the voltage-regulator circuit. The regulating action in this case is produced by the loading of the current flow through the shunt-regulator tube 14 on the filter 12. In other words, assuming, for example, that the output voltage at the output terminals 21, 22 increases, then, by way of the amplifier 15, this increase is effective to increase the voltage signal supplied to the control electrode 17 of the tube 14 thereby increasing the current drawn by the tube 14. This, in turn, causes an increase in the voltage drop across the internal resistance of the filter 12 thereby decreasing the output voltage-back to the desired constant value.

The operation of the compensating network 30 of the FIG. 3 regulator circuit in preventing self-oscillation of the closed loop feed-back circuit formed by the amplifier 15 and the tube 14 is similar to the operation of the corresponding network in the FIG. 2 regulator circuit. In other words, the resistor $R_1$ serves to isolate the feed-back circuit formed by the amplifier 15 and the tube 14 from the circuit capacitance represented by the condenser C. Similarly, the variation of the reactance of the condenser $C_2$ with frequency serves to shift the amplifier 15 input from the output terminal 21 to the anode 19 of the tube 14, thereby to allow conventional operation of the voltage-regulator circuit for the direct-current and lower frequency components or any current variations drawn by the load 13. The alternating-current equivalent circuit diagram of FIG. 2a may also be taken as referring to the FIG. 3 voltage-regulator circuit, provided the equivalent resistor R is understood to represent the control electrode 17 to anode 19 conductance of the tube 14.

COMPENSATING NETWORK OF FIG. 4

Figure 4:
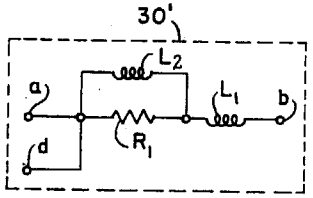
FIG. 4 is a circuit diagram of an alternate form of compensating network which may be utilized in the FIGS. 2 and 3 voltage-regulator circuits.

Referring now to FIG. 4 of the drawings, there is shown an alternative form of compensating network 30' which may be utilized in place of the compensating network 30 of either the FIG. 2 or FIG. 3 voltage-regulator circuits. In use, the terminals a, b, and d of the network 30' are connected to the same points as the correspondingly designated terminals of the network 30 of either FIG. 2 or FIG. 3.

In operation the resistor $R_1$ and the inductance coil $L_1$ serve to isolate the feed-back circuit of the voltage regulator from the circuit capacitance across the output terminals thereof in the same manner as previously mentioned. The FIG. 4 network differs from that previously mentioned in that a second inductance coil $L_2$ is coupled across the isolating resistor $R_1$ and serves to by-pass this resistor for the direct-current and low-frequency components of any current variations drawn by the load. This is feasible because the reactance of the inductance coil $L_2$ is negligible for the low-frequency components and increases as the frequency is increased. For frequencies where the reactance of the inductance coil $L_2$ becomes greater than the resistance of the resistor $R_1$, the inductance coil $L_2$ is, in effect, no longer in the circuit thus allowing the resistor $R_1$ to perform the desired function of isolation.

From the foregoing description of the various embodiments of the invention it will be apparent that a voltage regulator constructed in accordance with the invention represents a new and improved voltage-regulator circuit which is capable of having a high degree of direct-current stability and which is not readily susceptible to self-oscillation.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A voltage-regulator circuit for supplying a constant magnitude direct-current voltage to a load and normally having circuit capacitance coupled across the output terminals thereof which tends to cause the voltage-regulator circuit to oscillate, the voltage-regulator circuit comprising: supply circuit means for supplying a direct-current voltage; an electron-discharge device for adjusting the magnitude of the direct-current voltage supplied to the load; amplifier circuit means responsive to variations in the magnitude of the voltage supplied to the load for controlling the operation of the electron-discharge device to compensate for such voltage variations; first impedance means for isolating the closed loop feed-back circuit formed by the electron-discharge device and the amplifier circuit means from the circuit-capacitance for minimizing undesired high-frequency phase shift introduced thereby which tends to cause this closed loop feed-back circuit to undergo high-frequency oscillations; and second impedance means for by-passing the first impedance means for enabling normal operation of the voltage-regulator circuit for the lower frequency components of the load current variations.

2. A voltage-regulator circuit for supplying a constant magnitude direct-current voltage to a load and normally having circuit capacitance coupled across the output terminals thereof which tends to cause the voltage-regulator circuit to oscillate, the voltage-regulator circuit comprising: supply circuit means for supplying a direct-current voltage; an electron-discharge device for adjusting the magnitude of the direct-current voltage supplied to the load; amplifier circuit means responsive to variations in the magnitude of the voltage supplied to the load for controlling the operation of the electron-discharge device to compensate for such voltage variations; first impedance means including a resistor for isolating the closed loop feed-back circuit formed by the electron-discharge device and the amplifier circuit means from the circuit capacitance for minimizing undesired high-frequency phase shift introduced thereby which tends to cause this closed loop feed-back circuit to undergo high-frequency oscillations; and second impedance means for by-passing the first impedance means for enabling normal operation of the voltage-regulator circuit for the lower frequency components of the load current variations.

3. A voltage-regulator circuit for supplying a constant magnitude direct-current voltage to a load and normally having circuit capacitance coupled across the output terminals thereof which tends to cause the voltage-regulator circuit to oscillate, the voltage-regulator circuit comprising: supply circuit means for supplying a direct-current voltage; an electron-discharge device for adjusting the magnitude of the direct-current voltage supplied to the load; amplifier circuit means responsive to variations in the magnitude of the voltage supplied to the load for controlling the operation of the electron-discharge device to compensate for such voltage variations; first impedance means including a resistor connected in series with an inductance coil for isolating the closed loop feed-back circuit formed by the electron-discharge device and the amplifier circuit means from the circuit capacitance for minimizing undesired high-frequency phase shift introduced thereby which tends to cause this closed loop feed-back circuit to undergo high-frequency oscillations; and second impedance means for by-passing the first impedance means for enabling normal operation of the voltage-regulator circuit for the lower frequency components of the load-current variations.

4. A voltage-regulator circuit for supplying a constant magnitude direct-current voltage to a load and normally having circuit capacitance coupled across the output terminals thereof which tends to cause the voltage-regulator circuit to oscillate, the voltage-regulator circuit comprising: supply circuit means for supplying a direct-current voltage; an electron-discharge device for adjusting the magnitude of the direct-current voltage supplied to the load; amplifier circuit means responsive to variations in the magnitude of the voltage supplied to the load for controlling the operation of the electron-discharge device to compensate for such voltage variations; first impedance means for isolating the closed loop feed-back circuit formed by the electron-discharge device and the amplifier circuit means from the circuit capacitance for minimizing undesired high-frequency phase shift introduced thereby which tends to cause this closed loop feed-back circuit to undergo high-frequency oscillations, and second impedance means including a by-pass resistor and a condenser for enabling the resistor to by-pass the first impedance means for enabling normal operation of the voltage-regulator circuit for the lower frequency components of the load current variations.

5. A voltage-regulator circuit for supplying a constant magnitude direct-current voltage to a load and normally having circuit capacitance coupled across the output terminals thereof which tends to cause the voltage-regulator circuit to oscillate, the voltage-regulator circuit comprising: supply circuit means for supplying a direct-current voltage; an electron-discharge device having a cathode, a control electrode, and an anode for adjusting the magnitude of the direct-current voltage supplied to the load; amplifier circuit means coupled to the control electrode of the electron-discharge device and responsive to variations in the magnitude of the voltage supplied to the load for controlling the conductivity of the electron-discharge device to compensate for such voltage variations; first impedance means connected in series between one of the output terminals of the voltage-regulator circuit and a point common to one of the other electrodes of the electron-discharge device and the input to the amplifier circuit means for isolating the closed loop feed-back circuit formed by the electron-discharge device and the amplifier circuit means from the circuit capacitance for minimizing undesired high-frequency phase shift introduced thereby which tends to cause this closed loop feed-back circuit to undergo high-frequency oscillations; and second impedance means for by-passing the first impedance means for enabling normal operation of the voltage-regulator circuit for the lower frequency components of the load current variations.

6. A series-type voltage regulator circuit for supplying a constant magnitude direct-current voltage to a load and normally having circuit capacitance coupled across the pair of output terminals thereof which tends to cause the voltage-regulator circuit to oscillate, the voltage-regulator circuit comprising: supply circuit means for supplying a direct-current voltage; an electron-discharge device having a cathode, a control electrode, and an anode, the anode-to-cathode discharge path of the device being coupled in series between the supply circuit means and a first one of the output terminals of the voltage-regulator circuit for adjusting the magnitude of the direct-current voltage supplied to the load; amplifier circuit means coupled between the control electrode of the electron-discharge device and the mentioned first output terminal and responsive to variations in the magnitude of the voltage supplied to the load for controlling the conductivity of the electron-discharge device to compensate for such voltage variations; first impedance means including a resistor connected in series in the path between the mentioned first output terminal of the voltage-regulator circuit and a point common to the output electrode of the electron-discharge device and the input to the amplifier circuit means for isolating the closed loop feed-back circuit formed by the electron-discharge device and the amplifier circuit means from the circuit capacitance for minimizing undesired high-frequency phase shift introduced thereby which tends to cause this closed loop feed-back circuit to undergo high frequency oscillations; and second impedance means for by-passing the first impedance means for enabling normal operation of the voltage-regulator circuit for the lower frequency components of the load current variations.

7. A shunt-type voltage-regulator circuit for supplying a constant magnitude direct-current voltage to a load and normally having circuit capacitance coupled across the pair of output terminals thereof which tends to cause the voltage-regulator circuit to oscillate, the voltage-regulator circuit comprising: supply circuit means for supplying a direct-current voltage to the output terminals of the voltage-regulator circuit; an electron-discharge device having a cathode, a control electrode, and an anode, the anode-to-cathode discharge path of the device being coupled across the output terminals of the voltage-regulator circuit for adjusting the magnitude of the direct-current voltage supplied to the load by adjusting the loading on the supply circuit means; amplifier circuit means coupled between the control electrode and the anode of the electron-discharge device and responsive to variations in the magnitude of the voltage supplied to the load for controlling the conductivity of the electron-discharge device to compensate for such voltage variations; first impedance means including a resistor connected in series in the path between the anode of the electron-discharge device and the corresponding output terminal of the voltage-regulator circuit for isolating the closed loop feedback circuit formed by the electron-discharge device and the amplifier circuit means from the circuit capacitance for minimizing undesired high-frequency phase shift introduced thereby which tends to cause this closed loop feed-back circuit to undergo high-frequency oscillations; and second impedance means for by-passing the first impedance means for enabling normal operation of the voltage-regulator circuit for the lower frequency components of the load current variations.

*8. A voltage-regulator circuit for supplying a constant magnitude direct-current voltage to a load and normally having circuit capacitance coupled across the output terminals thereof which tends to cause the voltage-regulator circuit to oscillate, the voltage-regulator circuit comprising: supply circuit means for supplying a direct-current voltage; an electronic valve for adjusting the magnitude of the direct-current voltage supplied to the load; amplifier circuit means responsive to variations in the magnitude of the voltage supplied to the load for controlling the operation of the electronic valve to compensate for such voltage variations; first impedance means for isolating the closed loop feed-back circuit formed by the electronic valve and the amplifier circuit means from the circuit capacitance for minimizing undesired high-frequency phase shift introduced thereby which tends to cause this closed loop feed-back circuit to undergo high-frequency oscillation; and second impedance means for by-passing the first impedance means for enabling normal operation of the voltage-regulator circuit for the lower frequency components of the load current variations.*

References Cited in the file of this patent or the original patent

UNITED STATES PATENTS 2,594,006 Friend ---------- Apr. 22, 1952